(12) United States Patent
Miyauchi et al.

(10) Patent No.: US 11,074,441 B2
(45) Date of Patent: Jul. 27, 2021

(54) IMAGE PROCESSING APPARATUS, STORAGE MEDIUM, AND IMAGE PROCESSING METHOD FOR PERFORMING IMAGE REPEAT PRINT PROCESSING

(71) Applicant: CANON KABUSHIKI KAISHA, Tokyo (JP)

(72) Inventors: Takashi Miyauchi, Inagi (JP); Naoki Ito, Tokyo (JP); Yutaro Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/412,236

(22) Filed: May 14, 2019

(65) Prior Publication Data

US 2019/0354755 A1  Nov. 21, 2019

(30) Foreign Application Priority Data

May 17, 2018 (JP) .............................. JP2018-095658

(51) Int. Cl.
  *G06K 9/00* (2006.01)
  *H04N 1/00* (2006.01)

(52) U.S. Cl.
  CPC ..... *G06K 9/00449* (2013.01); *G06K 9/00456* (2013.01); *G06K 9/00463* (2013.01); *H04N 1/00167* (2013.01)

(58) Field of Classification Search
  CPC ........... G06K 9/00449; G06K 9/00456; G06K 9/00463; H04N 1/00167
  See application file for complete search history.

(56) References Cited

U.S. PATENT DOCUMENTS

| 5,223,939 | A | * | 6/1993 | Imaizumi | ........... H04N 1/00567 347/101 |
| 5,566,004 | A | * | 10/1996 | Imaizumi | ............. H04N 1/3875 358/449 |
| 8,587,818 | B2 | * | 11/2013 | Imaizumi | ............. H04N 1/3878 358/1.18 |
| 2014/0078522 | A1 | * | 3/2014 | Hiraki | .................... H04N 1/344 358/1.2 |

(Continued)

FOREIGN PATENT DOCUMENTS

| JP | 2004248262 A | 9/2004 |
| JP | 2011-055131 A | 3/2011 |

*Primary Examiner* — Shefali D Goradia
(74) *Attorney, Agent, or Firm* — Canon U.S.A., Inc. IP Division

(57) ABSTRACT

Image analysis processing is performed on a scanned image to detect a document area and, based on the detected document area, a tilt-corrected document image is obtained by extraction and tilt correction of the document image. Further, an image output size of printing an image in a repeat target area specified based on the tilt-corrected document image is specified, magnification of the image in the repeat target area is changed to the output size, and the image is repeatedly laid out within a specified sheet size. Thus, in an apparatus that generates a repeat layout processed output image and controls print processing, an image output size which is the same as an image output size for the front side of a sheet is specified for the back side of the sheet in a case where the repeat layout processing is performed on both the sides of the sheet.

20 Claims, 13 Drawing Sheets

(56) References Cited

U.S. PATENT DOCUMENTS

| | | | |
|---|---|---|---|
| 2018/0077309 A1* | 3/2018 | Saitoh | H04N 1/3873 |
| 2019/0286383 A1* | 9/2019 | Ito | G06F 3/1208 |
| 2019/0286397 A1* | 9/2019 | Ito | G06F 3/1256 |

* cited by examiner

FIG.10
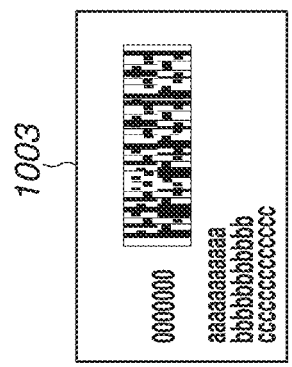
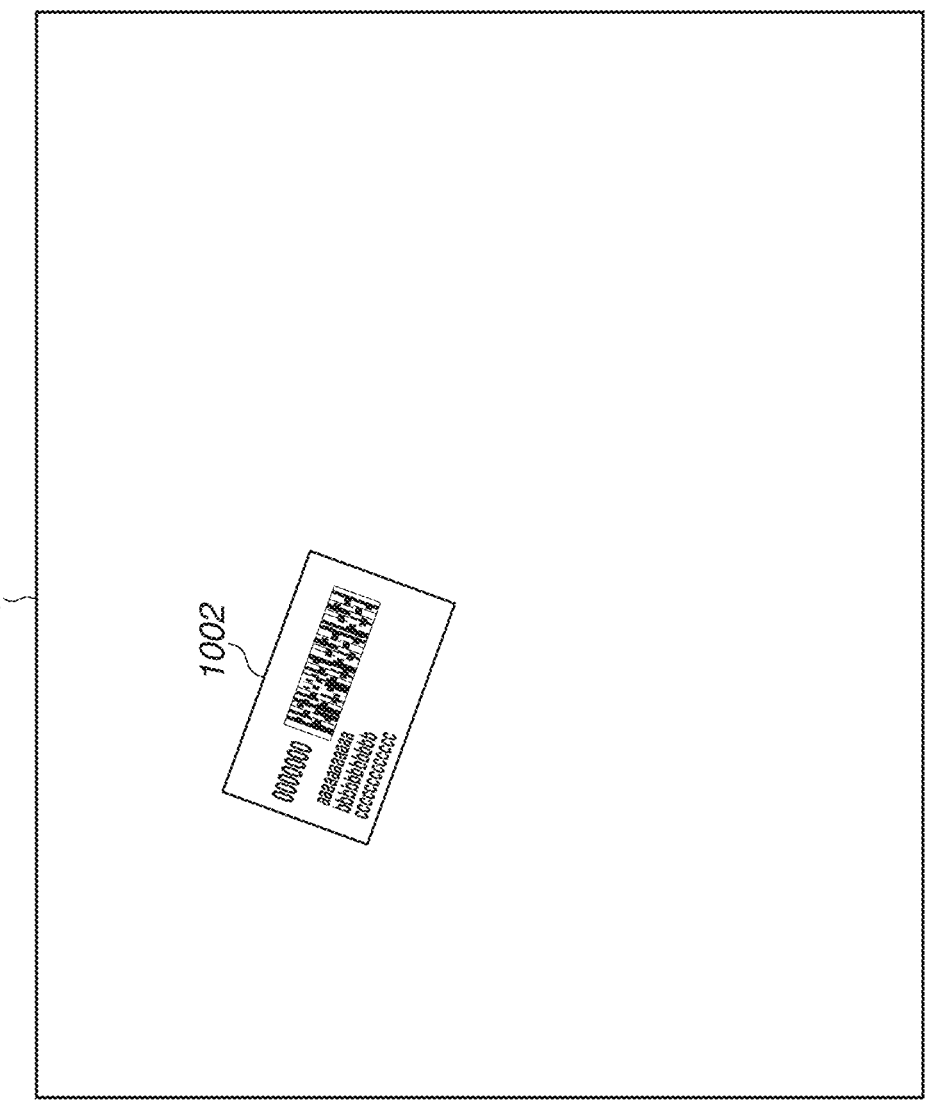

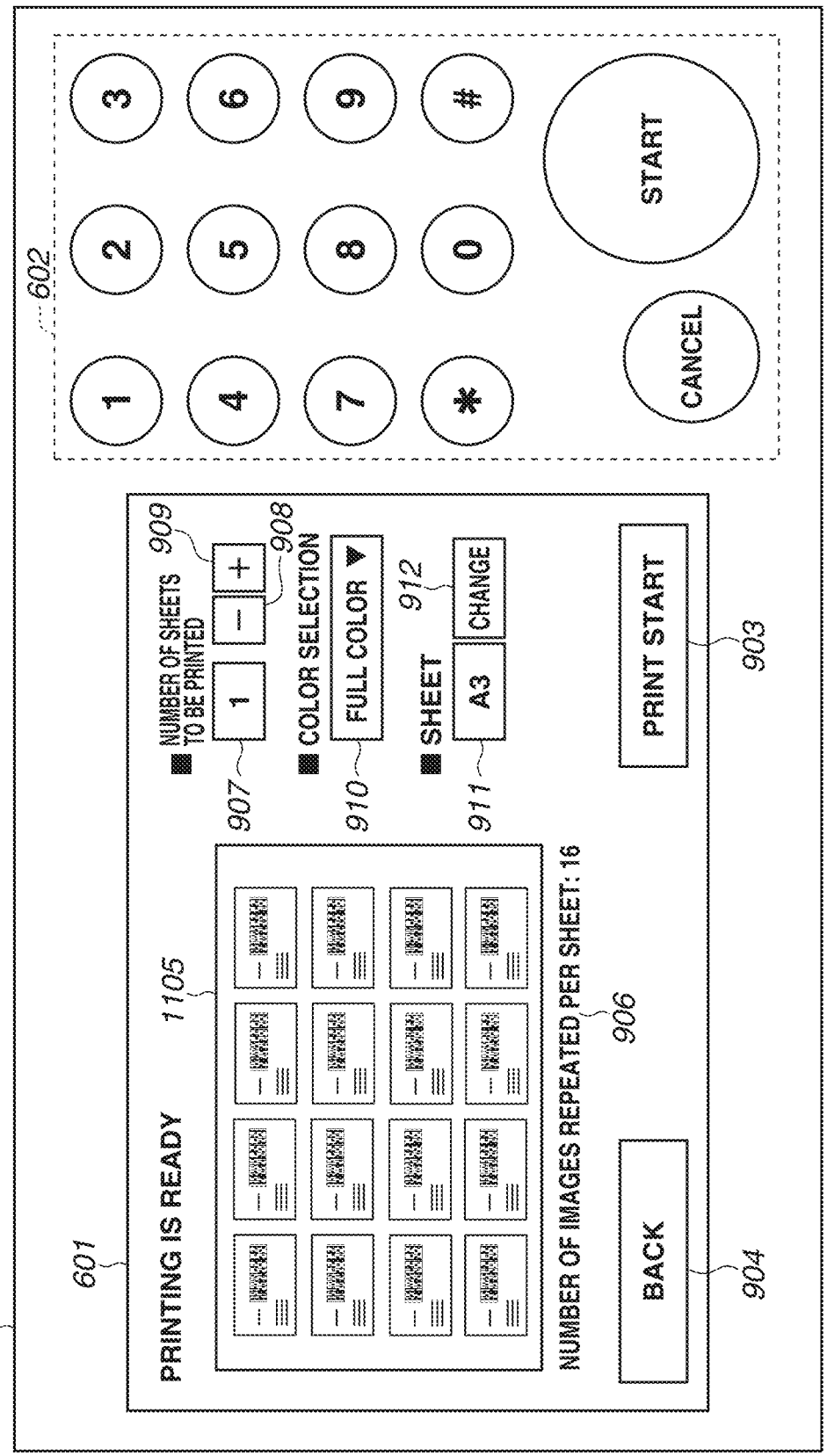

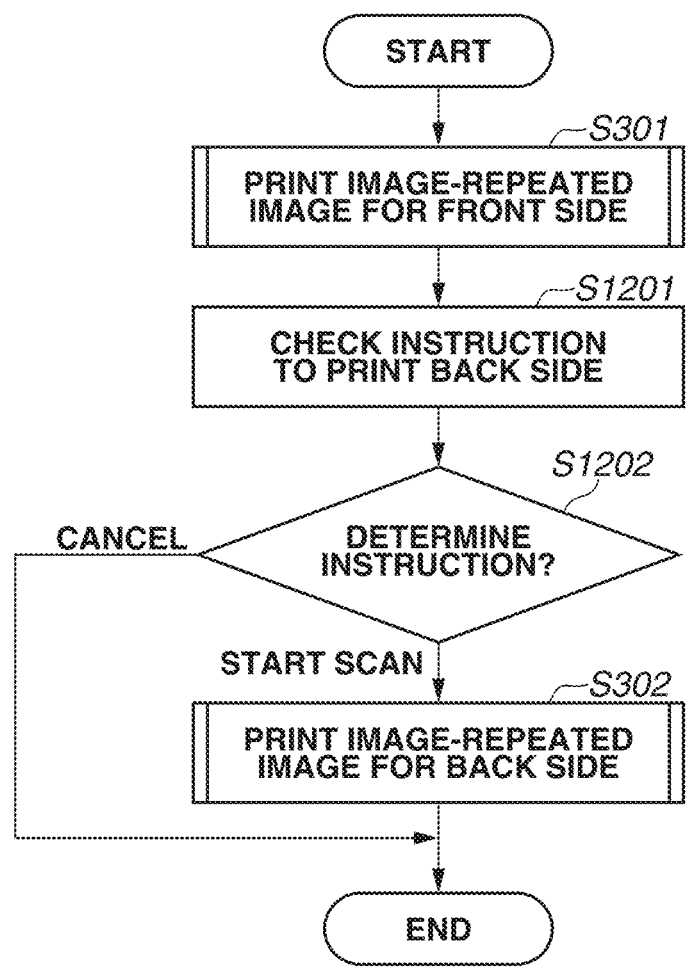

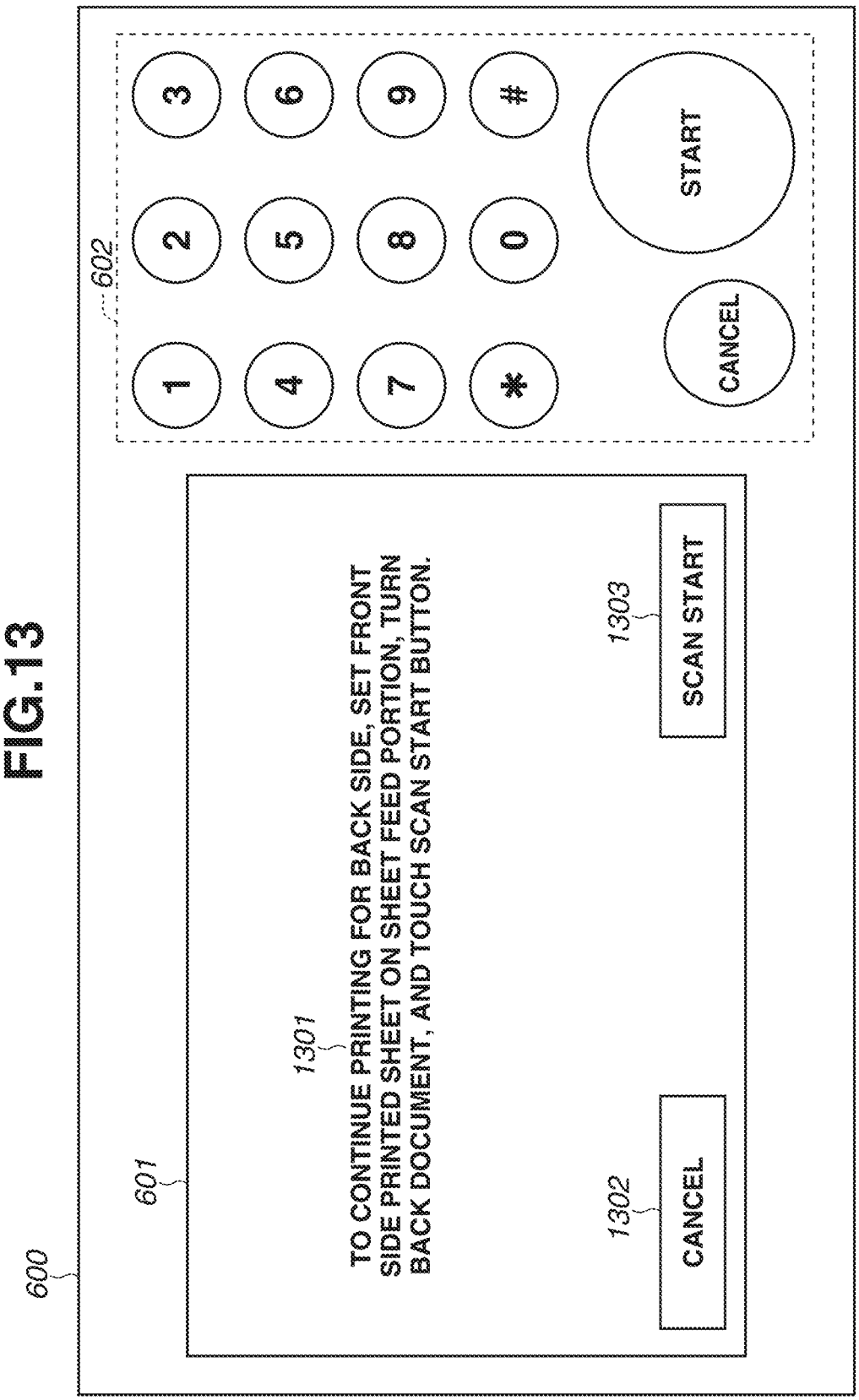

IMAGE PROCESSING APPARATUS, STORAGE MEDIUM, AND IMAGE PROCESSING METHOD FOR PERFORMING IMAGE REPEAT PRINT PROCESSING

BACKGROUND

Field of the Disclosure

The present disclosure generally relates to double-side printing and more specifically to repeatedly laying out a repeat target image, which is a part of a document image included in a scanned image, on one recording sheet.

Description of the Related Art

Among image forming apparatuses, such as a copying machine and a multi-function peripheral device, some apparatuses have an image repeat print function. This image repeat print function determines a repeat target image that is a part of an image of a document (document image) read by a scanner, repeatedly lays out the repeat target image, and prints the laid-out repeat target images on one recording sheet. Japanese Patent Application Laid-Open No. 2004-248262 discusses a technique of allowing a user to determine whether margins are provided between adjacent laid-out repeat target images and a technique of allowing the user to set the number of images to be arranged in a vertical direction and the number of images to be arranged in a horizontal direction.

Japanese Patent Application Laid-Open No. 2011-055131 discusses a technique for displaying an image read by a scanner, allowing a user to specify corners of a square frame on the displayed image, clipping a portion corresponding to the square frame, repeatedly laying out the clipped image as a repeat target image, and printing the thus obtained image.

In a case of a double-side printed document, for example, a driver's license and a business card, there is such a demand that, by using the image repeat print function, an image on a front side of the document is repeatedly printed on a front side of a sheet and an image on a back side of the document is repeatedly printed on a back side of the sheet, and the sheet thus double-side printed is then cut using a cutting machine, to obtain many double-side printed copies of the document. If, however, a user manually specifies a square frame for a repeat target image using the technique discussed in Japanese Patent Application Laid-Open No. 2011-055131, the user may specify a frame size of the front side and a frame size of the back side differently from each other. If the repeat target image on the front side and the repeat target image on the back side which are different from each other in image sizes are repeatedly laid out and printed on the front side and the back side of a sheet, respectively, the repetitive layout on the front side and the repetitive layout on the back side may not be aligned with each other. In this case, for example, if the printed sheet is cut along the layout of the printed result on the front side, the cutting results may deviate from the layout of the printed result on the back side. In other words, there is such a demand that positions of the repeat target images to be repeatedly laid out on the front and back sides of a sheet are easily aligned with each other.

SUMMARY

According to an aspect of the present disclosure, an image processing apparatus includes a memory that stores a program, and at least one processor that executes the program to perform detecting a document area by performing image analysis processing on a scanned image, obtaining a tilt-corrected document image by performing extraction of a document image and tilt correction of the document image based on the detected document area, specifying, as output size specification processing, an image output size for a repeat target area, specified based on the tilt-corrected document image; generating a repeat layout processed output image by repeat layout processing, of the tilt-corrected document image, in which magnification in the repeat target area, of the tilt-corrected document image is changed to the specified image output size and the magnification changed image is repeatedly laid out within a specified sheet size; and controlling execution of print processing on a sheet using the repeat layout processed output image, wherein in the output size specification processing, in a case where the repeat layout processing is performed on both sides of the sheet, a same image output size is specified for front and back sides of the sheet.

Further features of the present disclosure will become apparent from the following description of exemplary embodiments with reference to the attached drawings.

BRIEF DESCRIPTION OF THE DRAWINGS

FIG. 10 is a diagram illustrating an example of an image that is obtained as a result of reading a back side of a document placed on the platen, and an example of the back side of the document.

FIG. 11 is a diagram illustrating an example of a preview screen that provides a preview of an image obtained by the image repeat processing (repeat layout processing) for the back side.

FIG. 12 is a flowchart illustrating the image repeat processing on both sides of a sheet according to a second exemplary embodiment.

FIG. 13 is a diagram illustrating an example of a check screen for checking whether processing for the back side is to be performed.

DESCRIPTION OF THE EMBODIMENTS

Exemplary embodiments of the present disclosure will be described in detail below with reference to the drawings.

Components described in the exemplary embodiments are just examples, and the scope of the disclosure is not limited to them.

<System Configuration>

Figure 1:
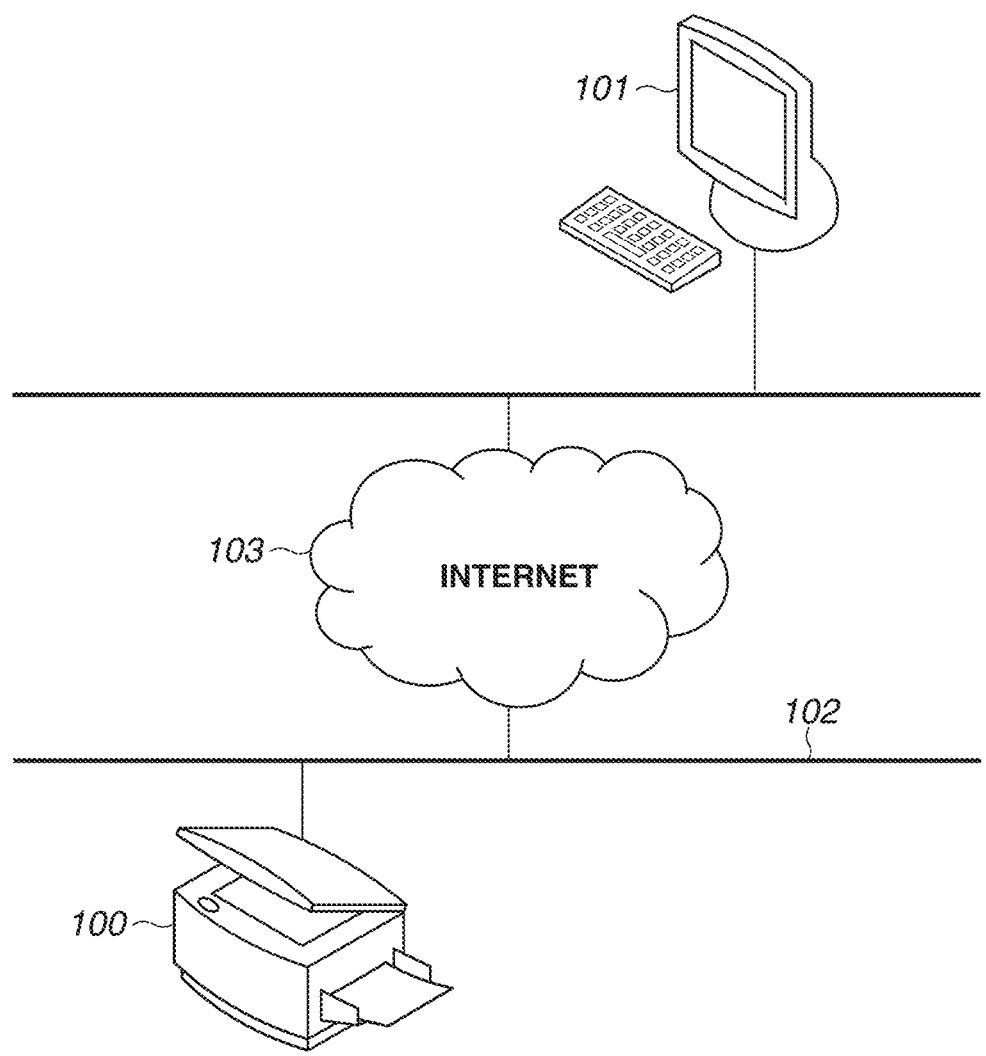
FIG. 1 is a diagram illustrating an example of a whole configuration of a system.

FIG. 1 is a diagram illustrating a whole configuration of a system to which a first exemplary embodiment is applicable. As illustrated in FIG. 1, an image forming apparatus (image processing apparatus) 100 is connected to a local area network (LAN) 102, and is able to communicate with, for example, a terminal 101 such as a personal computer (PC) via, for example, an internet 103. To achieve the present exemplary embodiment, the terminal 101 such as the PC is not always necessary, and thus only the image forming apparatus 100 may be used.

The image forming apparatus (image processing apparatus) 100, which is a multi-function peripheral (MFP) device including a display and operation unit, a scanner unit, and a printer unit, can be used as a scan terminal that scans a document (documentation, a business card, an identification (ID) photo, a certificate, or a post card) using the scanner unit. The display and operation unit including a touch panel and hardware buttons is used for displaying a scanned image or a preview image of a layout processing result, and a user interface for receiving an instruction from a user. According to the present exemplary embodiment, repeat layout processing (hereinafter referred to also as image repeat processing) is performed for repeatedly laying out, on an output document, an image which is a processing target in an area automatically extracted or manually specified from a scanned image, and a preview image of the layout processing result is displayed on a screen. When the user touches a print start button on the preview image, the printer unit performs the print processing.

According to the present exemplary embodiment, as an example, the image forming apparatus 100 independently performs scan processing, repeat layout processing, and print processing. Alternatively, a part of processing may be performed by the terminal 101 which is another device. For example, the image forming apparatus 100 performs the scan processing and the repeat layout processing, and transmits the layout-processed image to the terminal 101 as another device via a network. The terminal 101 may print the image.

<Hardware Configuration of Image Forming Apparatus 100>

Figure 2:
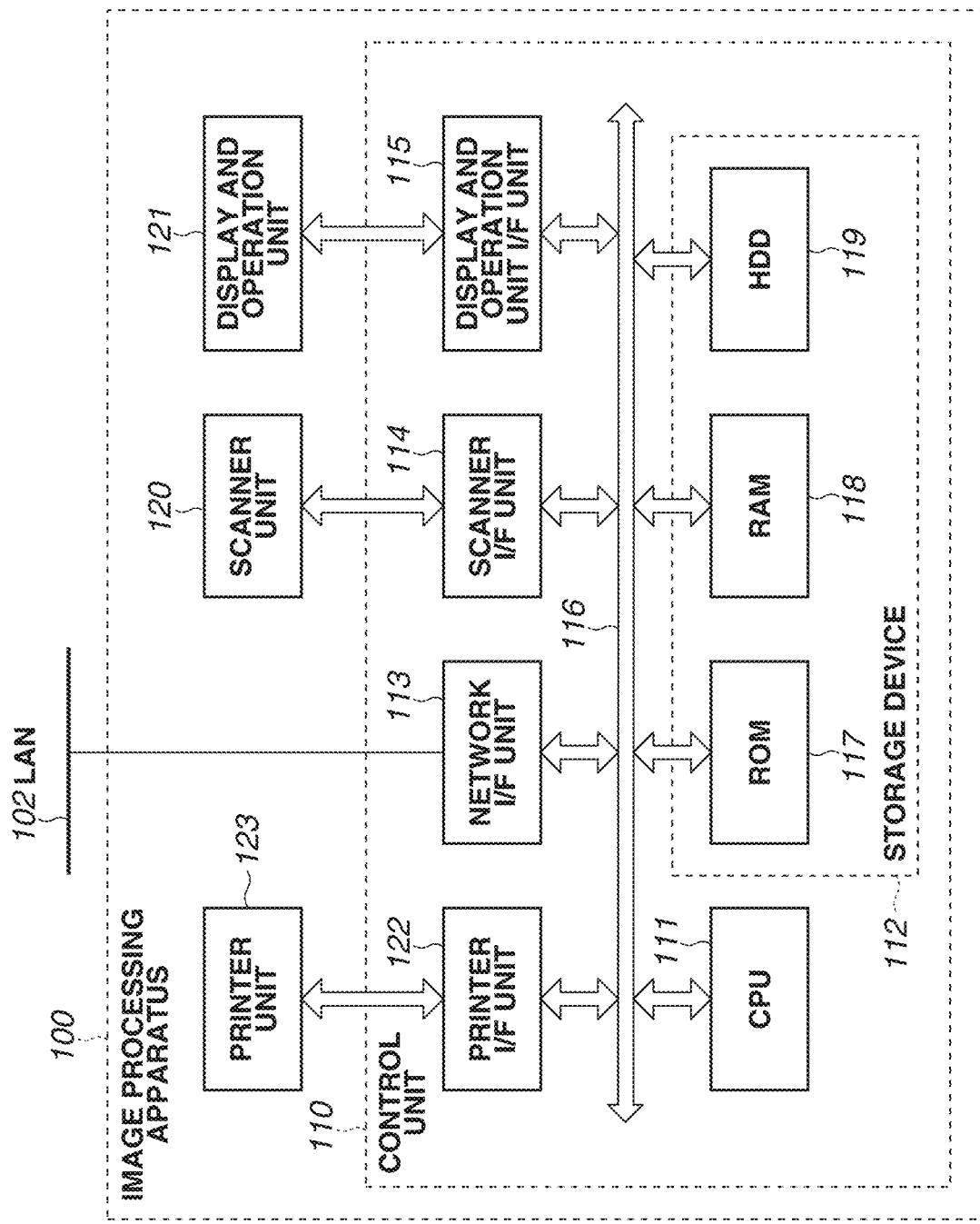
FIG. 2 is a diagram illustrating an example of a hardware configuration of an image forming apparatus.

FIG. 2 is a block diagram illustrating a configuration of the image forming apparatus 100. The control unit 110 is configured so that a CPU 111, a memory 112 (a read only memory (ROM) 117, a random access memory (RAM) 118, and a hard disc drive (HDD) 119), a network interface (I/F) unit 113, a scanner I/F unit 114, a display and operation unit I/F unit 115, and a printer I/F unit 122 are connected to communicate with each other via a system bus 116. The control unit 110 controls a whole operation of the image forming apparatus 100.

The CPU 111 reads out a control program stored in the memory 112 and performs the control program to function as means for performing each processing (for example, reading control, display control, and print control) in a flowchart, described below. The memory 112 stores the program, image data, metadata, setting data, and processed result data and holds them. Examples of the memory 112 are the ROM 117 which is a nonvolatile memory, the RAM 118 which is a volatile memory, and the HDD 119 which is a large-capacity storage area. The ROM 117 is the nonvolatile memory that holds the control program, and the CPU 111 reads out the control program and performs control. The RAM 118 is the volatile memory which is a temporary storage area to be used as a main memory of the CPU 111 and a work area.

The network I/F unit 113 connects the control unit 110 (the image forming apparatus 100) to the LAN 102 via the system bus 116. The network I/F unit 113 transmits image data to an external apparatus on the LAN 102, and receives various information from the external apparatus on the LAN 102.

The scanner I/F unit 114 connects a scanner unit 120 to the control unit 110 via the system bus 116. The scanner unit 120 reads an image on a document to generate scanned image data, and transmits the scanned image data to the control unit 110 via the scanner I/F unit 114.

The display and operation unit I/F unit 115 connects a display and operation unit 121 to the control unit 110 via the system bus 116. The display and operation unit 121 includes a liquid crystal display unit having a touch panel function, and a keyboard.

The printer I/F unit 122 connects a printer unit 123 to the control unit 110 via the system bus 116. The printer unit 123 receives image data, which has been generated and been subject to the layout processing by the CPU 111, via the printer I/F unit 122 and prints the received image data on a recording sheet.

The image forming apparatus 100 according to the present exemplary embodiment having the above hardware configuration can provide an image processing function.

<Image Repeat Processing Function>

A description will be given of the image repeat processing as the image processing function according to the present exemplary embodiment.

The image forming apparatus 100 scans a document placed on a platen of the scanner unit 120 and obtains a scanned image. The image forming apparatus 100 performs image analysis processing on the obtained scanned image to detect a document area, extract the document area, and correct tilt, whereby a tilt-corrected document image is obtained. Details of the document area detection processing will be described below. The image forming apparatus 100 causes a user to specify an output size of a repeat target image to be printed, and specifies a repeat target area in the tilt-corrected document image based on the tilt-corrected document image and the output size specified by the user. The image forming apparatus 100 calculates magnification of the repeat target image based on the size of the specified repeat target area and the specified output size, and performs magnification processing based on the calculated magnification in such a manner that the repeat target image is printed with the specified output size. The image forming apparatus 100 then determines a layout for the magnification-changed image in the repeat target area. In the layout, the magnification-changed image is repeatedly laid out on an output image corresponding to a specified sheet size and the laid out images are fitted to the size. Details of layout determination processing will be described below. The image forming apparatus 100 lays out the repeat target image which has been subject to the magnification processing in accordance with the determined layout and generates an image repeat processed result image to display the preview image on a user interface (UI) of the display and operation unit. The image forming apparatus 100 can accept an instruction to print the image repeat processed result image from a user via the display and operation unit. In this operation, if the repeat target area deviates from a user's desired position, the position and the size of the repeat target area may be corrected in response to a user's instruction. If the repeat target area is corrected, the image forming apparatus 100 extracts a repeat target image based on the position of the corrected repeat target area, calculates a magnification of the corrected repeat target image based on the size of the corrected repeat target area and the output size for printing specified by the user, and sets the layout again.

Figure 3:
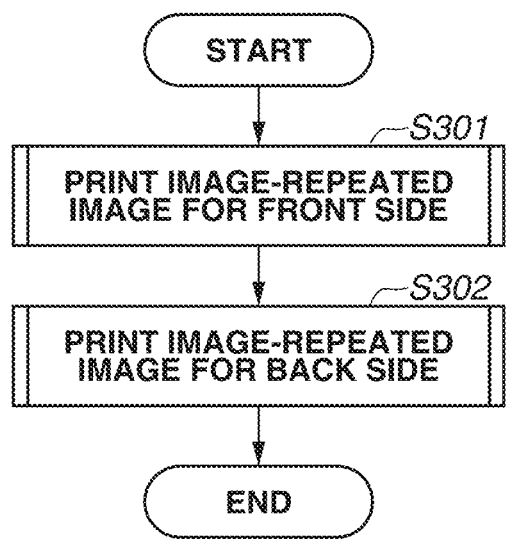
FIG. 3 is a flowchart illustrating image repeat processing on both sides of a sheet according to a first exemplary embodiment.
Figure 4:
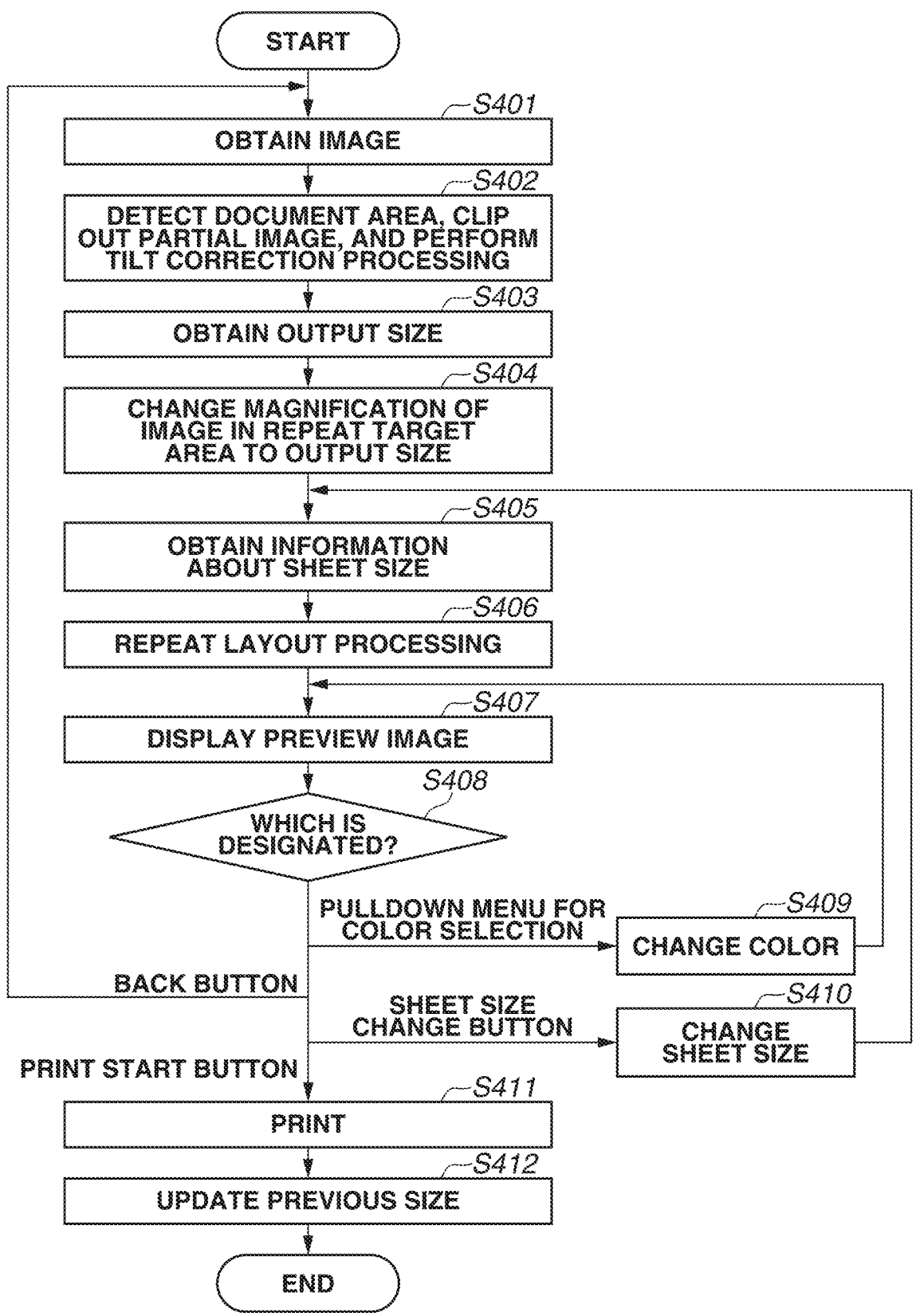
FIG. 4 is a flowchart illustrating details of image repeat processing according to the first exemplary embodiment.
Figure 5:
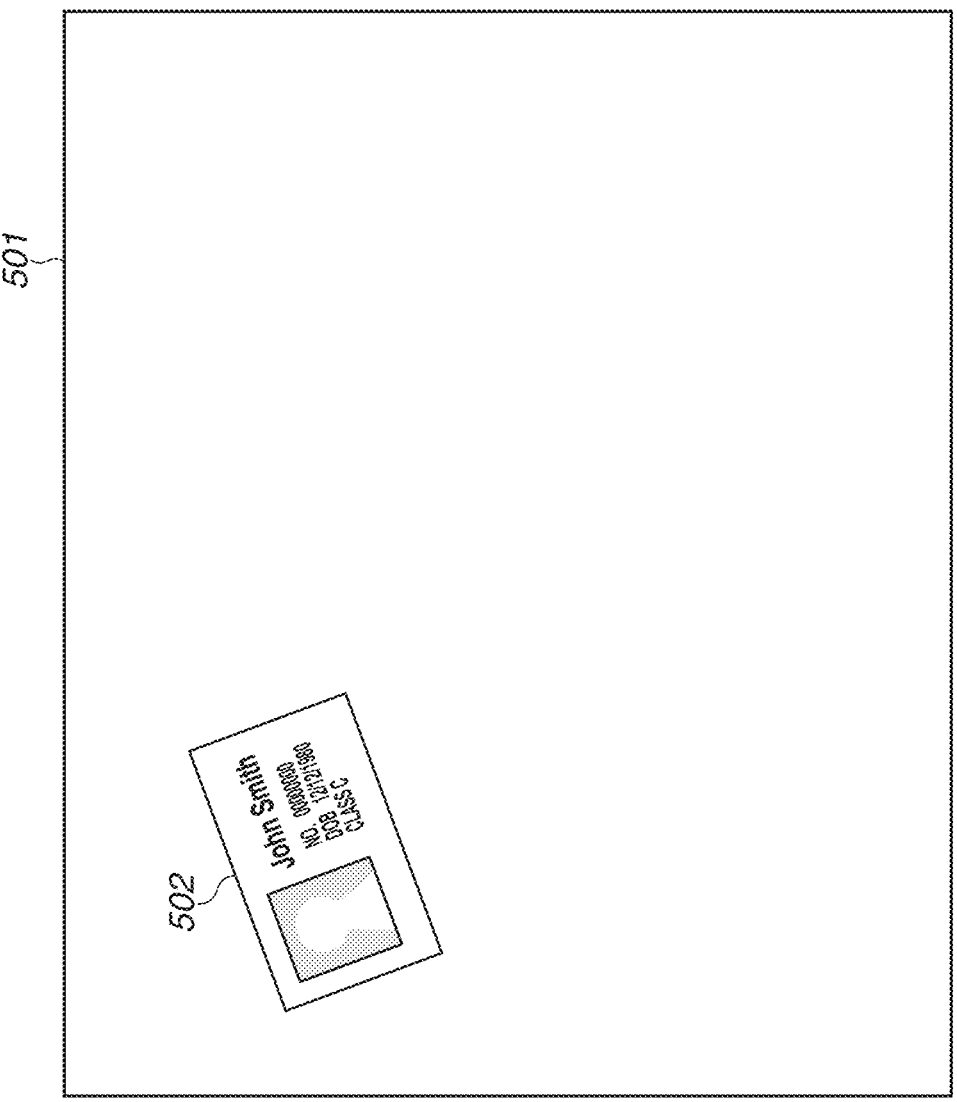
FIG. 5 is a diagram illustrating an example of an image that is obtained as a result of reading a front side of a document placed on a platen, and an example of the front side of the document.

FIG. 3 is a flowchart illustrating processing for obtaining a printed material which is a result of performing the image repeat processing on both sides of a document by the image repeat processing for the front side of the document and the image repeat processing for the back side of the document. FIG. 4 is a flowchart illustrating details of the image repeat processing in steps S301 and S302 in FIG. 3. The CPU 111 of the image forming apparatus 100 functions as a processing unit that performs the processing in each step in FIGS. 3 and 4 by loading a processing program stored in the ROM 117 into the RAM 118 and executing the program. According to the present exemplary embodiment, front and back sides of a driver's license 503 illustrated in FIG. 5 are scanned as a scan target document. The scan target document, however, is not limited to a driver's license. Examples of the scan target document include regular-sized and irregular-sized documents, a business card, an identification (ID) photo, various cards, and a post card.

Figure 6:
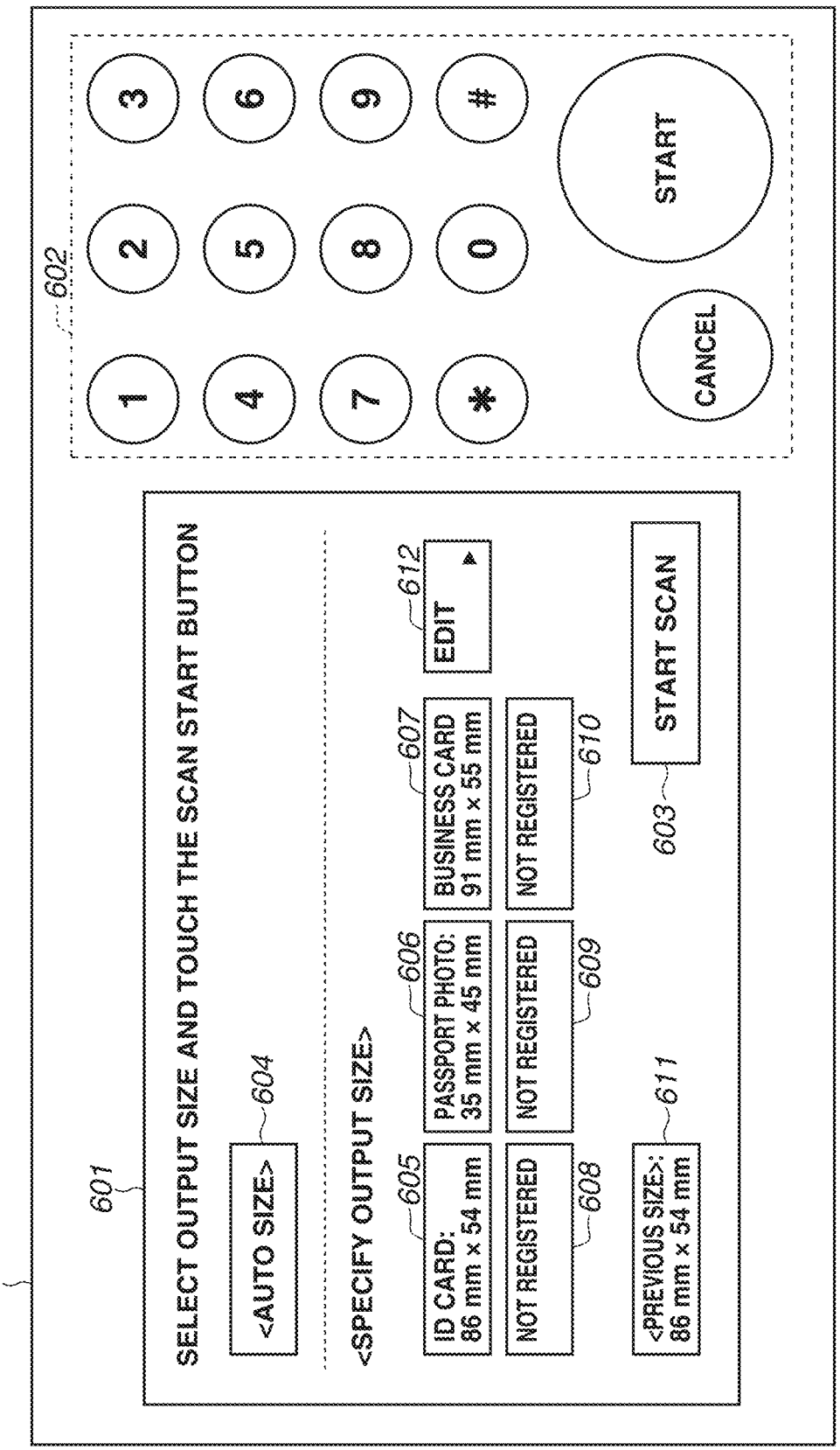
FIG. 6 is a diagram illustrating an example of an operation screen.
Figure 7:
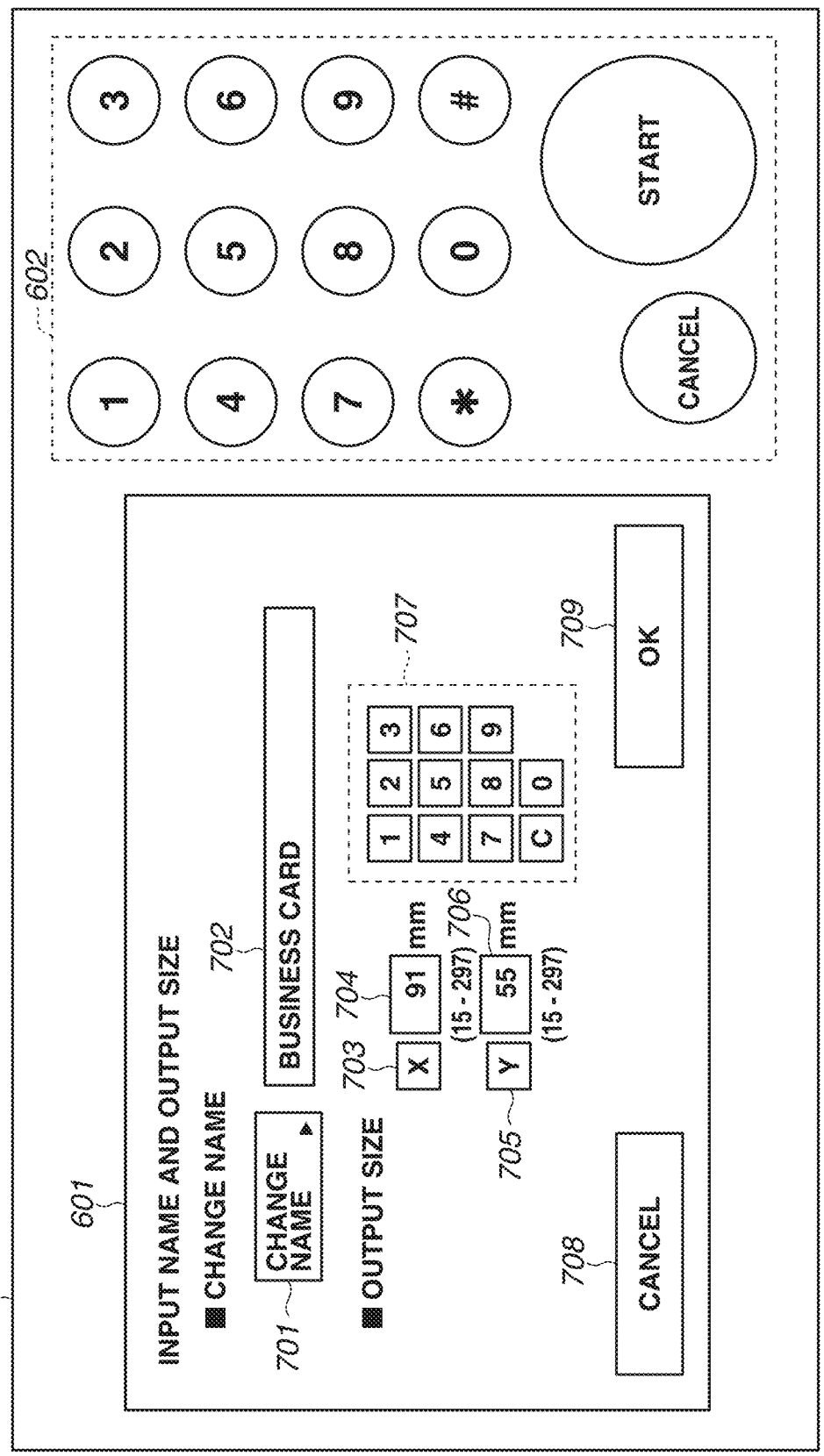
FIG. 7 is a diagram illustrating an example of a button editing screen for an output size.

When a user specifies a mode of the image repeat processing on an operation screen of the image forming apparatus 100, the operation screen is displayed on a touch panel display area 601 in FIG. 6. In FIG. 6, the display and operation unit 121 includes the touch panel display area 601 and hardware keys 602 (for example, numeric keypads and a start key for various processing). The touch panel display area 601 displays a message for prompting the user to set a document on the platen and to start scan, and a scan start button (software key) 603 for receiving an instruction to start scanning. The touch panel display area 601 further displays buttons 604 to 611 for allowing the user to specify an output size, and an editing button 612 for allowing the user to optionally edit output sizes and names of the buttons 605 to 610. An auto size button 604 is used for automatically determining the output size based on a size of the detected document area. Output size specification buttons 605, 606, 607, 608, 609, and 610 are used for registering sizes in advance that are used frequently as the output size. The user simply touches any one of the buttons 605 to 610 so that the user can easily specify a corresponding output size. For example, the button 605 indicating "ID card: 86 mm×54 mm" is for specifying an output size of 86 mm wide and 54 mm long (this size is frequently used for ID cards) as the output size for printing the repeat target image. The button 606 indicating "passport photo: 35 mm×45 mm" is for specifying an output size of 35 mm wide and 45 mm long (this size is frequently used for a passport photo). The button 607 "business card: 91 mm×55 mm" is used for specifying an output size of 91 mm wide and 55 mm long (this size is frequently used for a business card). No output size is currently registered for the buttons 608, 609, and 610. When the editing button 612 is touched with any one of the buttons 605 to 610 being selected, a button editing screen illustrated in FIG. 7 is displayed, and thus a registered content of the selected button, i.e. any one of the buttons 605 to 610, can be edited. On the button editing screen illustrate in FIG. 7, button names are displayed on a text field 702. When a name changing button 701 and the text field 702 are touched, a software keyboard is displayed on the touch panel display area 601. The user can input a button name. As for the output size of the repeat target image to be printed, a width size and a length size can be input using a software numeric keypad 707. The width size and the length size can be input using the software numeric keypad 707 while an X button 703 and a Y button 705 are in a selected state by a user's touch operation. The number of characters to be used for setting a button name and width and length sizes of a clipped-out image to be printed are limited to a certain value range. An attempt to set any numerical value which deviates from the range may result in an error. The user can change a registered button name and an output size of a clipped-out image to be printed by the editing button 612.

A previous size button 611 is used for calling an output size of a repeat target image that has been used for the previous image repeat processing and has been stored. The repeat processing with the output size used for the previous image repeat processing can be performed by the previous size button 611. Thus, when the image repeat processing on a back side of a document is performed after a front side of the document is printed in the image repeat processing, a layout for the printing on a back side of the front-side-printed sheet can be set similar to a layout for the printing on a front side by the previous size button 611.

On the screen in FIG. 6, when the user selects any one of the buttons 604 to 611 for specifying the output size and touches the scan start button 603, in step S301, the CPU 111 generates an image-repeated image of the front side based on a size of the document placed on the platen and the specified size of an output sheet.

<Detailed Description of Image Repeat Print Processing>

Details of the image repeat processing for generating an image-repeated image will be described with reference to FIG. 4.

In step S401, the CPU 111 of the image forming apparatus causes the scanner unit 120 to obtain an image. If the driver's license 503 in FIG. 5 and irregular-sized documents are placed on the platen and are scanned, a document size detection sensor fails to automatically detect a document size. Thus, in the image repeat processing according to the present exemplary embodiment, the whole platen is read, and a scanned image with the same size to the platen is obtained. According to the present exemplary embodiment, a scanned image 501 illustrated in FIG. 5 is obtained as a result of the scanning. In this operation, if the driver's license 503 is placed on the platen inappropriately, the driver's license is scanned with a tilt to the platen. The resulting scanned image 501 then includes a tilted driver's license image 502.

In step S402, the CPU 111 performs the image analysis processing (document area detection processing) on the image obtained in step S401 to detect a document area, clips out a partial image on the detected document area, and performs tilt correction processing. Thus, the CPU 111 can clip the area of the driver's license image 502 from the scanned image 501 obtained in step S401 and obtain a tilt-corrected image. The processing for detecting the document area and the tilt correction processing can be implemented using conventional methods. For example, to detect a document area from a scan image, the CPU 111 can use a conventional technique for determining an edge-enhanced image by application of a Sobel filter to the scan image and detecting portions where pixels of high edge intensity are linearly arranged as the sides of the document. The CPU 111 then identifies four vertexes based on the detected four sides of the document, and clips out an image of the document area (i.e., extracts a document image from the scan image) based on the identified four vertexes. In a case where the image of the document area clipped from the scan image is tilted, the CPU 111 further performs tilt correction to obtain a tilt-corrected document image. For the tilt correction, for example, the CPU 111 may estimate the tilt angle based on the coordinate values of the identified four vertexes, and rotate the image in a direction to correct the tilt angle. The processing for clipping out the image of the document area (processing for extracting the document image) and the tilt correction processing may be executed in succession. The clipping and the tilt correction may be performed at the same time. For example, the CPU 111 can simultaneously implement the extraction of pixels in a rectangular area surrounded by the four vertexes and the tilt correction by performing predetermined projective transformation processing on the pixels in the rectangular area based on the coordinate values of the four vertexes.

In step S403, the CPU 111 obtains information about the output size specified on the screen in FIG. 6. In FIG. 6, if the output size has been specified by the auto size button 604, a size of the tilt-corrected document image obtained in step S402 is used as the output size.

In step S404, the CPU 111 specifies the tilt-corrected document image obtained in step S402 as the repeat target area based on the output size specified in step S403, and performs the magnification processing in such a manner that the image in the repeat target area is printed with the specified output size. The CPU 111 sets an area, which has a maximum area within the tilt-corrected document image in the same aspect ratio of the output size obtained in step S305, as the repeat target area, on a center position or substantially center position of the tilt-corrected document image. The CPU 111 calculates magnification based on information about the numbers of lateral and vertical pixels and resolution for the image in the repeat target area, information about resolution of the image to be printed, and the output size obtained in step S403. The CPU 111 performs the magnification processing by using, for example, a publicly-known bicubic method.

In step S405, the CPU 111 obtains information about a size of the specified output sheet. If the user does not specify the sheet size, the CPU 111 obtains information about a defaulted sheet size (for example, A4 size). In a case where using a sheet on a manual feed tray is specified in advance, the user may specify a sheet size in this processing.

Figure 8:
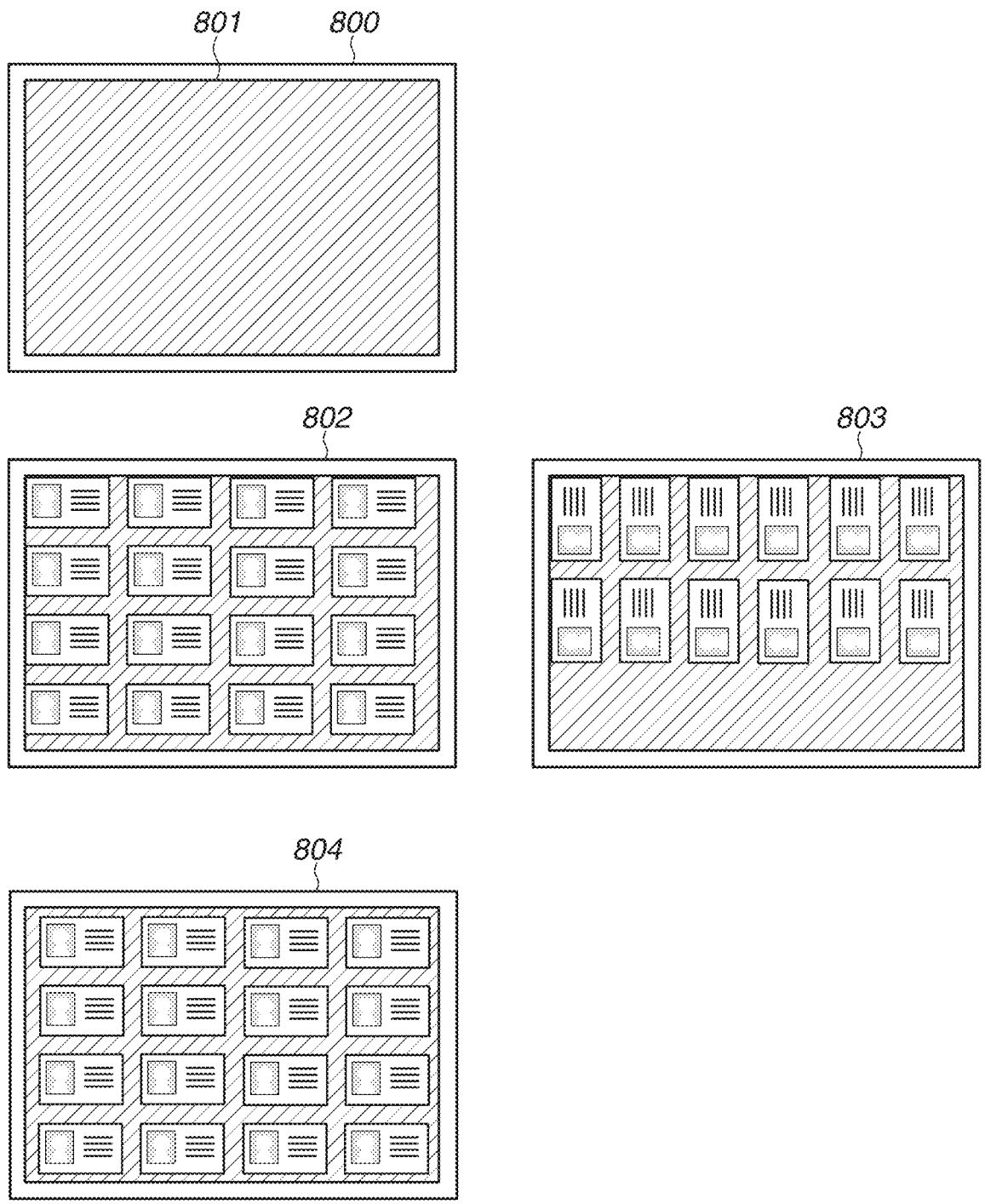
FIG. 8 is a diagram illustrating an example of layout processing for an image-repeated image.

In step S406, the CPU 111 determines positions, within the output sheet, where the repeat target image is repeatedly laid out, based on the output size obtained in step S403 and the information about the sheet size obtained in step S405, and generates an image-repeated image. FIG. 8 is a schematic diagram illustrating generation of an image-repeated image. The CPU 111 calculates a size 800 of the image-repeated image and a size 801 of a repeatable range based on the output size obtained in step S403 and a setting of a valid print area of the printer unit 123. As illustrated in a layout 802, the CPU 111 calculates how many repeat target images can be laid out on the repeatable range in order from an upper left portion. Then, as illustrated in a layout 803, the CPU 111 calculates how many repeat target images can be laid out on the repeatable range if the repeat target images rotated by 90 degrees are arranged from the upper left portion. In the repeat layout calculation, in the case where a margin as a space between the repeat target images is set in advance, the CPU 111 uses the set margin for the repeat layout calculation. The CPU 111 then selects the layout including a larger number of the repeat target images by comparing the layout not rotated 90 degrees and the layout rotated 90 degrees. If both the layouts include the same number of the repeat target images, the CPU 111 uses the layout in which the repeat target images are not rotated by 90 degrees. In FIG. 8, the layout 802 not rotated 90 degrees includes 16 images, and the layout 803 rotated 90 degrees includes 12 images. Thus, the CPU 111 uses the layout 802 "including the repeat target images not rotated", which is the layout including the larger number of the images. As illustrated in a layout 804, the CPU 111 adjusts the layout in such a manner that a center of the 16 repeat target images is arranged at a center of an output sheet while a relative positional relationship between the 16 repeat target images in the layout 802 "including the repeat target images not rotated" are kept remained, and generates an image-repeated image. More specifically, the CPU 111 generates the image-repeated image in such a manner that the center of the plurality of repeat target images is arranged at the center or substantially center of the output sheet rather than in such a manner that the plurality of repeat target images is arranged from upper left on the output sheet. With such an image-repeated image generation procedure, the image-repeated image can be generated without a partial omission of the laid-out repeat target image and with the maximum number of the repeat target images laid out on the output size obtained in step S403. According to the present exemplary embodiment, since the CPU 111 determines the layout in such a manner that the center of the repeat target images are printed at the center or substantially center of the output sheet, the repeat target images on the front side are aligned with the repeat target images on the back side in the double-side printing when both the output size of the repeat target images and the sheet size are the same with each other.

Figure 9:
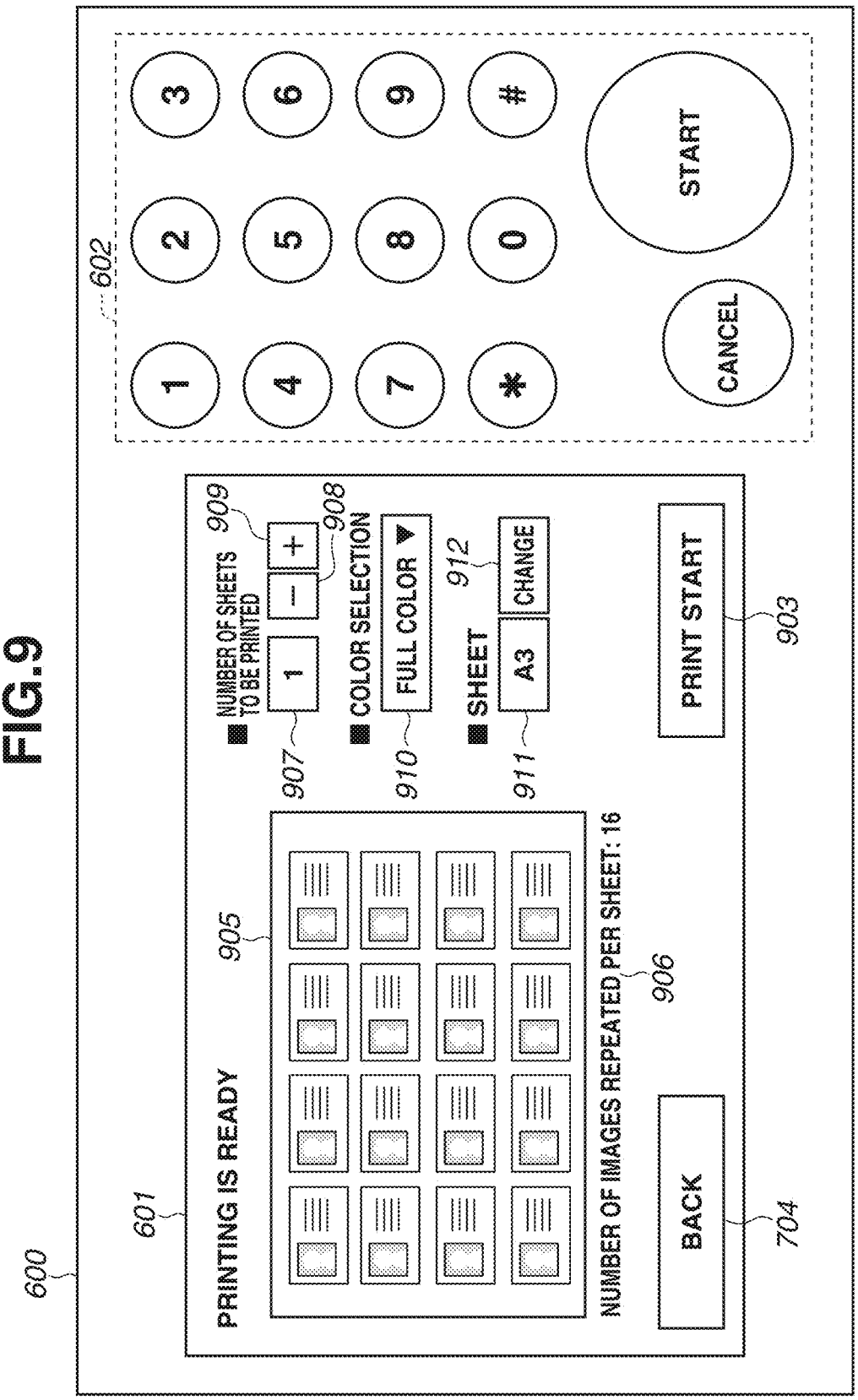
FIG. 9 is a diagram illustrating an example of a preview screen that provides a preview of an image obtained by the image repeat processing (repeat layout processing) for a front side.

In step S407, the CPU 111 generates a preview image 905 of the image-repeated image generated in step S406, and displays the preview image on a preview screen of the display and operation unit 121. The preview image displayed on the display and operation unit 121 will be described below with reference to FIG. 9. In FIG. 9, the image displayed on the touch panel display area 601 in FIG. 6 is changed into the preview image of the output image.

FIG. 9 illustrates the preview image 905 of the output image generated in step S406. Further, a field 906 displays information about the number of the repeat target images laid out on the output image generated in step S406. FIG. 9 illustrates an example in which the 16 repeat target images are laid out on one output image.

A field 907 displays a numerical value indicating the number of sheets for the output image to be printed. If the user touches a plus button 909, the number of sheets to be printed increases, and if the user touches a minus button 908, the number of sheets to be printed decreases. Every touch of the plus button or the minus button may increase or decrease the number of sheets to be printed one by one, and holing-down of the plus button or the minus button may continuously change the number of sheets indicated in the field 907. The user also can input the number of sheets to be printed in the filed 907 by using hardware keys 602.

A pulldown menu 910 allows the user to select printing between polychrome printing and monochrome printing for the output image. In a default setting, "full-color" is automatically selected for a color repeat target image, and "monochrome" is automatically selected for a monochrome repeat target image. The user can manually change the setting of the full-color printing or the monochrome printing using the pulldown menu 910 for color selection. As described in step S409 below, the preview image 905 is also changed in response to the changed setting if the setting is changed to the full-color printing or the monochrome printing. For example, if the user selects the monochrome printing in a case where the full color printing is automatically selected, the preview image 905 is accordingly changed to a monochrome preview image.

A field 911 displays a currently specified sheet size. By a user's touch operation on a sheet size change button 912, the CPU 111 performs sheet size change processing as described about step S410 below. In the case where the sheet size is changed, the CPU 111 performs the repeat layout processing in step S406 to regenerate an output image based on the changed sheet size and the size of the repeat target image, and updates the preview image 905 of the output image and the information about the number of repeat target images indicated in the field 906.

When the user touches a print start button 903, the CPU 111 fixes the image-repeated image and the print setting based on the current settings, and ends the processing. When the user touches a back button 904, the CPU 111 returns to the screen in FIG. 6.

Buttons to be used for instructions to correct the position and size of the repeat target area may be displayed on the preview image so that the correction can be made based on an instruction from the user. When the position and size of the repeat target area are corrected, the processing returns to step S404 and the CPU 111 performs the magnification processing using the image within the changed repeat target area.

In step S408, the CPU 111 determines whether which one of buttons and the pulldown menu on the preview image in FIG. 9 has been designated by the user. In a case where the CPU 111 determines that the user has designated the pulldown menu 910 for color selection (PULLDOWN MENU FOR COLOR SELECTION in step S408), the processing proceeds to step S409. In a case where the CPU 111 determines that the user has designated the sheet size change button 912 (SHEET SIZE CHANGE BUTTON in step S408), the processing proceeds to step S410. Further, in a case where the CPU 111 determines that the user has designated the print start button 903 (PRINT START BUTTON in step S408), the processing proceeds to step S411.

In a case where the CPU 111 determines that the user's instruction is a change in the setting of the full-color printing/monochrome printing by the pulldown menu 910 for color selection (PULLDOWN MENU FOR COLOR SELECTION in step S408) in step S409, the CPU 111 updates the display of the pulldown menu 910 in response to the changed setting in step S409. The processing returns to step S407, and the CPU 111 updates also the preview image 905 based on the changed setting. For example, in a case where the user has changed the setting from the full-color printing to the monochrome printing by the pulldown menu 910, the CPU 111 generates a monochrome preview image and updates the display of the preview image in step S407. The generation of the monochrome preview image and the output image is not limited to a mode in which the monochrome preview image and the output image are generated in response to the change of the setting to the monochrome printing using the pulldown menu 910. For example, in step S407, when the CPU 111 generates the preview image based on the output image generated in the repeat layout processing, a color preview image and a monochrome preview image may be generated in advance.

In a case where the CPU 111 determines that the user has touched the sheet size change button 912 (SHEET SIZE CHANGE BUTTON in step S408) in step S408, the CPU 111 displays a plurality of sheet size candidates (examples include regular-sized sheets of A4, A3, B4, and B5), and determines a sheet size designated by the user from among these candidates in step S410. While the sheet size is change by the user's selection of the sheet size from the normal sizes, the sheet size may be change in such a manner that the user manually inputs a non-normal sheet size (in vertical and lateral sizes of sheets). In step S410, in a case where the user has changed the sheet size, the CPU 111 obtains the changed sheet size in step S405, performs the repeat layout processing in step S406 based on the changed sheet size, and displays a preview image in step S407.

In a case where the CPU 111 determines that the user has touched the print start button 903 (PRINT START BUTTON in step S408) in step S408, the CPU 111 causes the printer unit 123 to perform the print processing using the image-repeated image generated in step S406 in step S411.

In step S412, the CPU 111 updates the information about the output size that is stored in association with the previous size button 611 illustrated in FIG. 6 using the output size obtained in step S403.

When the image repeat processing (step S301) described with reference to FIG. 4 is completed for the front side of the document, the processing proceeds to step S302, and the CPU 111 performs the image repeat print processing on the back side of the document.

In a case of performing the image repeat print processing for the back side of the document, the CPU 111 generates an image-repeated image for the back side when the previous size button 611 is selected and performs printing of the image-repeated image when the scan start button 603 is touched on the screen in FIG. 6. The procedure for generating the image-repeated image for the back side is basically equal to the procedure for generating the image-repeated image for the front side described with reference to FIG. 4, except for the processing in step S401. In step S401, the image to be scanned by the scanner unit 120 is a back side 1003 of a driver's license illustrated in FIG. 10, and the image obtained by the scan is a scanned image indicated by 1001. After the user sets the sheet, which has been subject to the print processing on the front side in step S301, on a sheet feed portion (for example, a manual sheet feed tray) for the sheet size specified in step S405 in such a manner that the back side of the sheet is to be subject to the print processing, the CPU 111 performs the image repeat print processing for the back side. Thus, a printed material that has been subject to the image repeat print processing for both the sides is obtained. The image to be displayed on the display and operation unit 121 in step S407 is not the image of FIG. 9 but a preview image illustrated in FIG. 11.

According to the first exemplary embodiment, in step S406, the CPU 111 generates the image-repeated image with center alignment, based on the output size and the sheet size. With such a layout, when image-repeated images generated based on the same sheet size and the same output size are printed on both the sides of a sheet, the repeat target images corresponding to each other on both sides of the sheet are printed on the same positions. Further, the previous size button 611 on the screen illustrated in FIG. 6 allows the user to easily specify an output size for the back side which is the same as the output size for the front side in the double-side printing.

According to the first exemplary embodiment, after the image repeat print processing for the front side is performed, the image repeat print processing for the back side is performed by using the previous size button 611 in FIG. 6. According to a second exemplary embodiment, after completion of the printing for the front side, a display for prompting the user to select whether the printing is continued for a back side is displayed, and thus the printing for the back side is facilitated.

FIG. 12 is a flowchart describing the image repeat print processing according to the second exemplary embodiment. Only the parts different from the flow chart according to the first exemplary embodiment will be described below.

Step S301 is similar to step S301 in the first exemplary embodiment.

After performing the image repeat print processing on the front side in step S301, in step S1201, a CPU 111 displays a check screen illustrated in FIG. 13. On the check screen, a message 1301, buttons 1302 and 1303 are displayed, and the CPU 111 accepts a user's instruction via the buttons 1302 and 1303. The message 1301 prompts the user to set a front side printed material on the sheet feed portion, turn back a document, and set the document on the scanner in the case where the printing is continued for the back side.

In step S1202, in a case where the user has touched the scan start button 1303 on the check screen illustrated in FIG. 13 (SCAN START in step S1202), the CPU 111 determines that the touch operation corresponds to an operation for selecting the previous size button 611 on the reading start screen illustrated in FIG. 6, and the processing proceeds to step S302. In a case where the user has touched the cancel button 1302 (CANCEL in step S1202), the CPU 111 ends the processing.

Step S302 is similar to step S302 according to the first exemplary embodiment.

According to the second exemplary embodiment, in the case where the check screen in FIG. 13 is displayed and the image repeat print processing for the back side is subsequently performed after printing for the front side is completed, the "previous size" is automatically used as an output size. Thus, the layouts on both the sides can be easily aligned with each other. Further, by the check screen for the back side, the user can be prompted to turn back the document and set the front side printed material on the sheet feed portion. Thus, an wrong operation by the user can be reduced, compared with the first exemplary embodiment.

The present disclosure is achieved also by a method in which software (a program), which achieves the functions according to the above described exemplary embodiments, is supplied to a system or an apparatus via a network or various storage media and a computer (or for example, a CPU or a microprocessing unit (MPU)) of the system or apparatus reads out the program and execute the program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-095658, filed May 17, 2018, which is hereby incorporated by reference herein in its entirety.

What is claimed is:

1. An image processing apparatus comprising:
a memory that stores a program; and
at least one processor that executes the program to perform:
detecting a document area corresponding to a document image by performing image analysis processing on a scanned image;
obtaining a tilt-corrected document image by performing tilt correction of the document image based on the detected document area;
specifying an output size for a repeat target area, wherein the repeat target area is specified on the tilt-corrected document image;
generating an output image by executing a repeat layout process that includes:
changing a size of an image corresponding to the repeat target area to the specified output size; and
repeatedly laying out the size-changed image within a specified sheet size; and
controlling execution of print processing on a sheet using the generated output image,
wherein if a predetermined instruction is selected by a user for the repeat layout process on both sides of the sheet, the output size specified for a first repeat target area to be repeatedly laid out for a front side of the sheet and the output size specified for a second repeat target area to be repeatedly laid out for a back side of the sheet are the same output size.

2. The image processing apparatus according to claim 1, wherein in the repeat layout process, a center of a plurality of the repeatedly laid-out images is arranged at a center or substantially center of the sheet, to generate the output image.

3. The image processing apparatus according to claim 1, wherein the at least one processor executes the program to further perform, in the output size specification processing, displaying a first button in which the output size has been registered, and in a case where a user selects the displayed first button, the output size registered in the selected first button is used as the specified output size.

4. The image processing apparatus according to claim 1, wherein the at least one processor executes the program to further perform, in the output size specification processing, displaying a second button for specifying a same output size as a previous output size, and in a case where the user selects the displayed second button as the predetermined instruction, the previous output size specified for the first repeat target area to be repeatedly laid out on the front side of the sheet is used as the output size specified for the second repeat target area to be repeatedly laid out on the back side of the sheet.

5. The image processing apparatus according to claim 1, wherein the at least one processor executes the program to further perform:
controlling displaying of a check screen for checking whether printing on the back side of the sheet is to be performed, after printing on the front side of the sheet; and
wherein a previous output size specified for the first repeat target area to be repeatedly laid out on the front side of the sheet is used as the output size specified for the second repeat target area to be repeatedly laid out on the back side of the sheet in a case where subsequent printing to be performed on the back side of the sheet is instructed as the predetermined instruction on the check screen.

6. A non-transitory computer readable storage medium storing a program for causing a processor to perform:
detecting a document area corresponding to a document image by performing image analysis processing on a scanned image;
obtaining a tilt-corrected document image by performing tilt correction of the document image based on the detected document area;
specifying an output size for a repeat target area that is specified on the tilt-corrected document image;
generating an output image by executing a repeat layout process that includes: changing a size of an image corresponding to the repeat target area to the specified output size; and repeatedly laying out the size-changed image within a specified sheet size; and
controlling execution of print processing on a sheet using the generated output image,
wherein, if a predetermined instruction is selected by a user for the repeat layout process on both sides of the sheet, the output size specified for a first repeat target area to be repeatedly laid out for a front side of the sheet and the output size specified for a second repeat target area to be repeatedly laid out for a back side of the sheet are the same output size.

7. The non-transitory computer readable storage medium according to claim 6, wherein in the repeat layout process, a center of a plurality of the repeatedly laid-out images is arranged at a center or substantially center of the sheet, to generate the output image.

8. The non-transitory computer readable storage medium according to claim 6, wherein the program causes the processor to further perform, in the output size specification processing, displaying a first button in which the output size has been registered, and in a case where a user selects the displayed first button, the output size registered in the selected first button is used as the specified output size.

9. The non-transitory computer readable storage medium according to claim 6, wherein the program causes the processor to further perform, in the output size specification processing, displaying a second button for specifying a same output size as a previous output size, and in a case where the user selects the displayed second button as the predetermined instruction, the previous output size specified for the first repeat target area to be repeatedly laid out on the front side of the sheet is used as the output size specified for the second repeat target area to be repeatedly laid out on the back side of the sheet.

10. The non-transitory computer readable storage medium according to claim 6,
wherein the program causes the processor to further perform:
controlling displaying of a check screen for checking whether printing on the back side of the sheet is to be performed, after printing on the front side of the sheet; and
wherein a previous output size specified for the first repeat target area to be repeatedly laid out on the front side of the sheet is used as the output size specified for the second repeat target area to be repeatedly laid out on the back side of the sheet in a case where subsequent printing to be performed on the back side of the sheet is instructed as the predetermined instruction on the check screen.

11. An image processing method to be executed by an image processing apparatus, the method comprising:
detecting a document area corresponding to a document image by performing image analysis processing on a scanned image;
obtaining a tilt-corrected document image by performing tilt correction of the document image based on the detected document area;
specifying an output size for a repeat target area that is specified on the tilt-corrected document image;
generating an output image by executing a repeat layout process that includes: changing a size of an image corresponding to the repeat target area to the specified output size; and repeatedly laying out the size-changed image within a specified sheet size; and
controlling execution of print processing on a sheet using the generated output image,
wherein, if a predetermined instruction is selected by a user for the repeat layout process on both sides of the sheet, the output size specified for a first repeat target area to be repeatedly laid out for a front side of the sheet and the output size specified for a second repeat target area to be repeatedly laid out for a back side of the sheet are the same output.

12. An image processing apparatus comprising:
a memory that stores a program; and
at least one processor that executes the program to perform:
specifying a target image to be repeatedly laid out;
specifying an output size for the target image;
generating an output image by executing a repeat layout process of the target image, wherein the repeat layout process includes changing a size of the specified target image to the specified output size and repeatedly laying out the size-changed target image within the specified sheet size; and
controlling execution of print processing on a sheet using the generated output image,
wherein, if a predetermined instruction is selected by a user, the output size specified for a first target image to be repeatedly laid out for a front side of the sheet and the output size specified for a second target image to be repeatedly laid out for a back side of the sheet are the same size.

13. The image processing apparatus according to claim 12, wherein the target image is specified on a scan image.

14. The image processing apparatus according to claim 12, wherein the target image is specified on a tilt-corrected document image which is obtained by detecting a document area from a scan image and correcting a tilt of a document image corresponding to the detected document area.

15. The image processing apparatus according to claim 12, wherein a first output image generated by repeatedly laying out the first target image is controlled to be printed at a center of the front side of the sheet, and wherein a second output image generated by repeatedly laying out the second target image is controlled to be printed at a center of the back side of the sheet.

16. The image processing apparatus according to claim 12, wherein the at least one processor executes the program to further perform displaying a button in which an output size used for a previous repeat layout process has been registered, and
 wherein, in a case where a user selects the displayed button as the predetermined instruction after the repeat layout process for the front side of the sheet is performed, the output size specified for the first target image to be repeatedly laid out for the front side of the sheet is used as the output size specified for the second target image to be repeatedly laid out for the back side of the sheet.

17. The image processing apparatus according to claim 12, wherein the at least one processor executes the program to further perform displaying buttons that include a first button in which predefined size is registered and a second button in which an output size used for a previous repeat layout process has been registered, and
 wherein, in a case where a user selects one of the displayed buttons, an output size registered in the selected button is specified for the target image.

18. The image processing apparatus according to claim 12, wherein the at least one processor executes the program to further perform:
 displaying a screen for checking whether printing on the back side of the sheet is to be performed; and
 wherein, in a case where the printing on the back side of the sheet is instructed as the predetermined instruction on the check screen, the output size for the second target image to be repeatedly laid out for the back side of the sheet is specified based on the output size specified for the first target image to be repeatedly laid out for the front side of the sheet.

19. A non-transitory computer readable storage medium storing a program for causing a processor to perform:
 specifying a target image to be repeatedly laid out;
 specifying an output size for the target image;
 generating an output image by executing a repeat layout process of the target image, wherein the repeat layout process includes changing a size of the specified target image to the specified output size and repeatedly laying out the size-changed target image within the specified sheet size; and
 controlling execution of print processing on a sheet using the generated output image,
 wherein, if a predetermined instruction is selected, the output size specified for a first target image to be repeatedly laid out for a front side of the sheet and the output size specified for a second target image to be repeatedly laid out for a back side of the sheet are the same size.

20. An image processing method to be executed by an image processing apparatus, the method comprising:
 specifying a target image to be repeatedly laid out;
 specifying an output size for the target image;
 generating an output image by executing a repeat layout process of the target image, wherein the repeat layout process includes changing a size of the specified target image to the specified output size and repeatedly laying out the size-changed target image within the specified sheet size; and
 controlling execution of print processing on a sheet using the generated output image,
 wherein, if a predetermined instruction is selected, the output size specified for a first target image to be repeatedly laid out for a front side of the sheet and the output size specified for a second target image to be repeatedly laid out for a back side of the sheet are the same size.

* * * * *